United States Patent [19]

Schaffer et al.

[11] 4,158,045

[45] Jun. 12, 1979

[54] CONTINUOUS PROCESS FOR CLEANING INDUSTRIAL WASTE GASES CONTAINING FORMALDEHYDE

[75] Inventors: Johann Schäffer, Gelnhausen-Meerholz; Willi Horrix, Hasselroth-Neuenhasslau, both of Fed. Rep. of Germany

[73] Assignee: UOP Inc., Des Plaines, Ill.

[21] Appl. No.: 860,007

[22] Filed: Dec. 12, 1977

[30] Foreign Application Priority Data

Sep. 17, 1977 [DE] Fed. Rep. of Germany ....... 2741929

[51] Int. Cl.² .............................................. B01D 53/34
[52] U.S. Cl. .................................... 423/245; 544/186
[58] Field of Search ................ 423/245, 234; 260/606; 544/186; 21/58

[56] References Cited

U.S. PATENT DOCUMENTS

| 860,456 | 7/1907 | Fournier | 423/245 |
| 2,449,040 | 9/1948 | Schidler et al. | 544/186 |
| 2,884,304 | 4/1959 | Grosskinsky et al. | 423/234 |
| 3,898,038 | 8/1975 | Anderson et al. | 423/245 |

Primary Examiner—Earl C. Thomas
Attorney, Agent, or Firm—James R. Hoatson, Jr.; Barry L. Clark; William H. Page, II

[57] ABSTRACT

Wet scrubbing process for cleaning waste gases containing formaldehyde such as those produced in the manufacture of fiber glass insulation has substantial advantages over alternative thermal incineration process in that it requires less capital equipment expense and utilizes far less energy for handling equal volumes of waste gases. The gases are scrubbed in two scrubbing zones, the first of which contains hexamethylenetetramine and ammonium hydroxide to which ammonia is added and the second of which has water added to it. A part of the second scrubbing solution is introduced into the first scrubbing solution and a part of the first scrubbing solution is drawn off from the system.

5 Claims, 1 Drawing Figure

U.S. Patent  Jun. 12, 1979  4,158,045
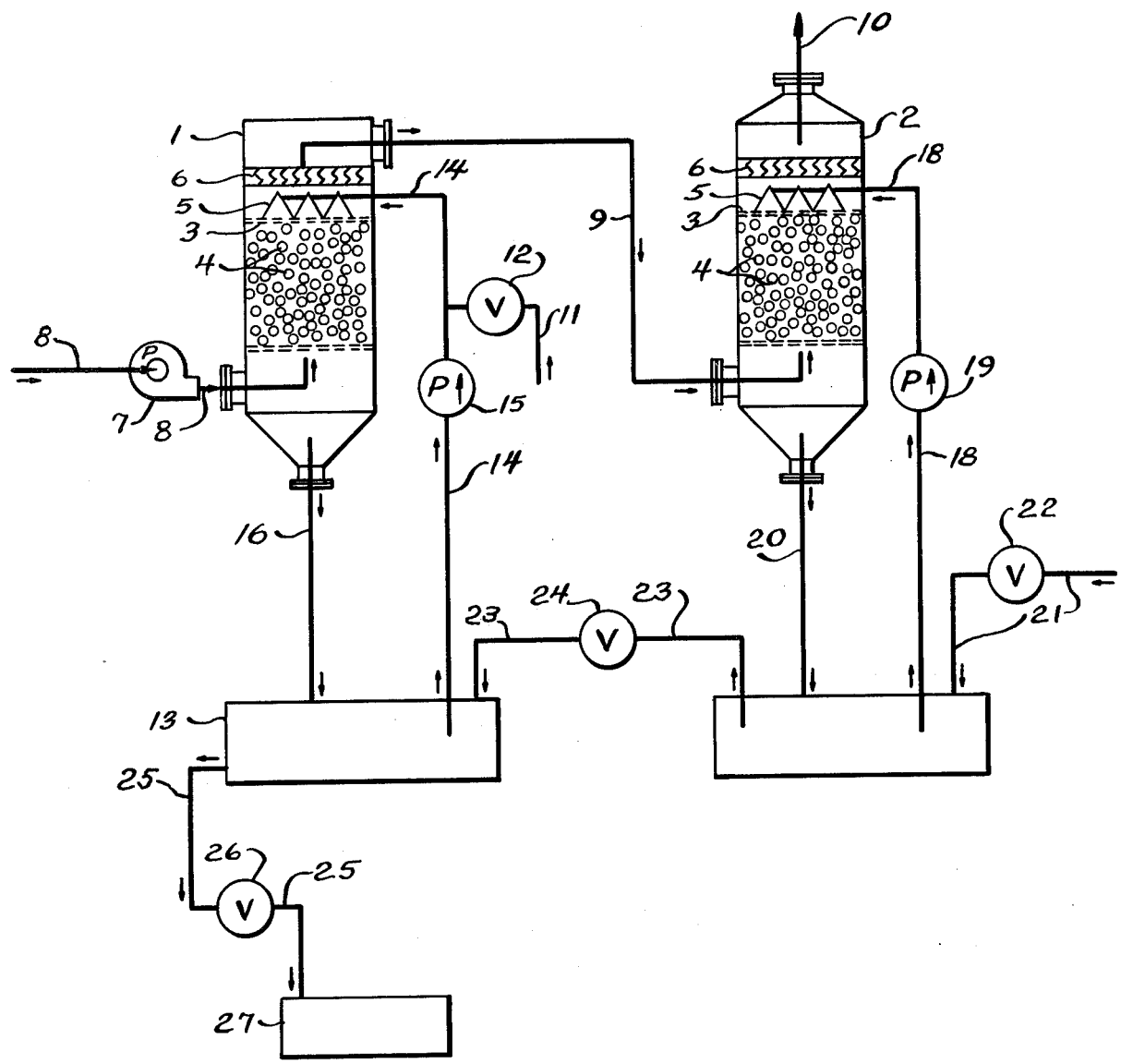

CONTINUOUS PROCESS FOR CLEANING INDUSTRIAL WASTE GASES CONTAINING FORMALDEHYDE

The invention relates to a continuous process for cleaning industrial waste gases containing formaldehyde. Such gases are produced for example when impregnating glass fibers for producing glass wool, wherein the glass fibers to be impregnated are sprayed with an aqueous emulsion of formaldehyde and binder and heated in a through-flow heater. Formaldehyde and steam are discharged in this operation.

Because of legal provisions and official regulations in various countries, limits are placed on the amounts of foreign substances, such as formaldehyde, which may be discharged to the atmosphere, so that such formaldehyde-containing industrial waste gases must be subjected to an exhaust cleaning operation.

It is known for formaldehyde-containing industrial emissions to be purified by heat treatment, but processes of this kind involve high investment and operating costs.

The problem upon which the present invention is based was therefore that of providing a process for cleaning formaldehyde-containing industrial waste gases, which process is more efficient and cheaper as regards investment costs and operating costs. In particular, the process of the invention is intended to be able to purify waste gases having a formaldehyde content of the order of magnitude of about 500 to 1000 mg/Nm$^3$, to result in a formaldehyde content of at the most 20 mg/Nm$^3$. In addition, the process is intended to provide that only the smallest possible amounts of waste water have to be drawn off from the operating procedure, and such waste waters, taking into consideration the technical regulations governing waste water, can be discharged into the public sewerage or can be passed to a regular deposit for special refuse. These and other advantages are achieved by the process of the invention.

The continuous process for cleaning industrial waste gases containing formaldehyde, according to the invention, is characterized in that the waste gases are scrubbed in a first scrubbing zone with a first aqueous scrubbing solution containing hexamethylenetetramine and ammonium hydroxide, with the addition of ammonia, and the hexamethylenetetramine content of the first scrubbing solution is maintained at at least 20% by weight by circulating the first scrubbing solution through the first scrubbing zone, the waste gases are then scrubbed with a second aqueous scrubbing solution in a second scrubbing zone, with the addition of water, and the pH value of the second scrubbing solution is maintained at not more than 12 by circulating the second scrubbing solution through the second scrubbing zone, a part of the second scrubbing solution is continuously or discontinuously introduced into the first scrubbing solution, and a part of the first scrubbing solution is continuously or discontinuously drawn out of the system.

In the first scrubbing zone the formaldehyde is to be reacted as far as possible quantitatively with ammonia to form hexamethylenetetramine. For this purpose the first scrubbing zone is fed with a small excess of ammonia relative to the stoichiometric amount. According to the vapor pressure of the ammonia, this excess, which is not consumed by reaction with formaldehyde, will pass into the second scrubbing zone. This is necessary in order to achieve the desired final state of purity of the waste gases in respect to ammonia. In order to keep the vapor pressure of the ammonia in the second scrubbing zone at a sufficiently low level, the pH value in the second scrubbing liquid is 12 at its maximum, this being in dependence on the saturation temperature in the second scrubbing zone. With the temperatures usually prevailing, the pH value of the second scrubbing liquid is usually maintained at 9, at its maximum, and is preferably adjusted to about 8 to 8.5, in particular about 8.2. At a lower saturation temperature, for example 25° C., the pH value of the second scrubbing liquid could, however, also be raised to about 11 to 12.

The pH value adjustment of the second scrubbing liquid is effected by circulation and a feed of fresh water to the circulating liquid through the second scrubbing zone, and suitable ammonium hydroxide metering in the first scrubbing zone.

For reliable operation and for a sufficient feed of ammonia to the first scrubbing zone, in order to achieve the best possible quantitative reaction of formaldehyde to form hexamethylenetetramine, it is advantageous for the feed of ammonia to the first scrubbing zone or the first scrubbing liquid to be regulated automatically or controlled in dependence on the pH value of the second scrubbing solution.

The control of the feed of ammonia can be effected manually on the basis of measurements of the pH value in the second scrubbing solution at intervals of time, or the feed of ammonia can be automatically regulated continuously or discontinuously, in dependence on the pH value in the second scrubbing solution. This is possible because, with a constant feed of fresh water to the second scrubbing solution, the pH value of the second scrubbing solution only depends on the ammonia excess which passes from the first scrubbing zone to the second scrubbing zone, so that an increase or a reduction in that excess results in a change in the pH value in the second scrubbing solution.

The circulations of scrubbing solutions and the introduction of the second scrubbing solution into the first scrubbing solution provides that the amount of waste water is kept as small as possible. The water drawn from the system can either be passed directly to the sewerage or to a special refuse treatment system.

As the industrial waste gases to be cleaned are usually at elevated temperature, for example a temperature of about 150° C., a part of the scrubbing water which circulates through the scrubbing zone is normally adiabatically evaporated so that a normal inconsiderable part of the scrubbing water leaves the second scrubbing zone, together with the purified waste gas, in the form of steam. Therefore, sufficient fresh water must be continuously or discontinuously added to the second scrubbing solution in order to replace the water which is discharged to the atmosphere as described above. Preferably, fresh water is also added continuously to the first scrubbing solution.

The increase in the hexamethylenetetramine content in the first scrubbing solution is effected by circulating the first scrubbing solution through the first scrubbing zone. The upper limit of the hexamethylenetetramine concentration in the first scrubbing solution is given by changing the physical properties such as the viscosity and surface tension of the scrubbing solution of the first scrubbing stage. It may be possible to use hexamethylenetetramine concentrations in the first scrubbing solution of 40 or 50% by weight, but it is preferable to adjust the hexamethylenetetramine content of the first scrubbing solution to 20 to 30% by weight. Adjusting the hexamethylenetetramine content in this way is effected, besides the circulation through the first scrubbing zone, by adjusting the amount of the second scrubbing solution which is transferred into the first scrubbing solution, and by the amount of the first scrubbing solution which is drawn out of the system, the amount of fresh water which is added to the second scrubbing solution, and possibly the amount of fresh water which is added to the first scrubbing solution.

BRIEF DESCRIPTION OF THE DRAWING

The invention is described in greater detail with reference to the drawing which diagrammatically shows a flow chart of the process of the invention. For the sake of clarity of the drawing, the two scrubbing zones have been shown as being arranged one after the other, but in the same manner it is possible for the two scrubbing zones to be arranged one above the other in a common outer case.

DESCRIPTION OF THE PREFERRED EMBODIMENT

In the illustrated flow chart, two gas scrubbers which are connected in series are denoted by reference numerals 1 and 2. Each of the gas scrubbers includes perforated plates 3 which are pervious to gas and liquid, while a fluidized layer of spherical contact bodies 4 is disposed between the plates 3. Provided above the plates 3 are atomizer nozzles 5, while above the atomizer nozzles 5 are droplet separators 6.

The waste gases to be cleaned, which are at a temperature for examples of 160° C., are passed by means of a blower 7 and conduit 8 into the lower part of the gas scrubber 1 and flow in counter-flow to the scrubbing liquid through the plates 3, the fluidized layer of spherical contact bodies 4 and the droplet separator 6, leaving the gas scrubber 1 at its upper end. Adiabatic cooling of the waste gases to be cleaned occurs in the gas scrubber 1, and a part of the water of the scrubbing liquid is evaporated and issues from the gas scrubber 1 at its upper end, with the cleaned waste gases.

The waste gases which have thus been subjected to a pre-cleaning operation pass by way of a conduit 9 to the lower end of the gas scrubber 2 and again pass in counter-flow to the scrubbing liquid through the plates 3, the fluidized layer of contact bodies 4 and the droplet separator 6, and leave the gas scrubber 2 through conduit 10 from which they are discharged to the atmosphere. Twenty-five percent (25%) ammonium hydroxide solution is passed by way of conduit 11 and valve 12 into the conduit 14 downstream of the pump 15 which returns the scrubbing liquid from the collecting tank 13 to the atomizer nozzles 5 of the gas scrubber 1, and constantly recycles the scrubbing liquid by way of the nozzles and the conduit 16. The scrubbing liquid in the similar collecting tank of the gas scrubber 2 is also passed by way of conduit 18 and pump 19 to the nozzles 5 of the gas scrubber 2 and constantly recycled by way of the nozzles 5 and the conduit 20. Fresh water is continuously added to the last mentioned collecting tank by way of conduit 21 and valve 22, and a part of the scrubbing liquid in the collecting tank of the gas scrubber 2 is continuously transferred to the collecting tank 13 of the gas scrubber 1, by way of conduit 23 with valve 24.

A part of the scrubbing liquid is continuously conducted from the collecting tank 13 by way of conduit 25 and valve 26, to the collecting tank 27.

Suitable adjustment of the valves 12, 22, 24 and 26 and of the speed of circulation through the pumps 15 and 19 provides that the hexamethylenetetramine concentration in the scrubbing liquids in the gas scrubbers 1 and 2 is adjusted to a value which lies within the claimed ranges. Preferably, the hexamethylenetetramine concentration in the scrubbing liquid which is circulated through the gas scrubber 1 is in the range of 20 to 30% by weight, while in the scrubbing liquid which is circulated through the gas scrubber 2, it is about 0.1% by weight. The following example will serve further to illustrate the invention.

EXAMPLE

Waste gas to be cleaned, discharged from a glass wool dryer at a maximum rate of 32,000 Nm$^3$/hour was conducted through the above-described apparatus. The waste gas had a maximum temperature of 160° C. and its concentration of noxious substance was 500 mg of formaldehyde/Nm$^3$, at its maximum. After the waste gas had passed through the gas scrubber 1, the waste gas temperature was about 55° C. 2000 Liters of fresh water per hour is passed by way of conduit 21 into the collecting tank of scrubber 2, having a volume of about 3 m$^3$. After a certain start-up time, these 3 m$^3$ contained about 30 kg of salts (hexamethylenetetramine). 2,000 Liters overflow per hour passed by way of conduit 23 from the collecting tank of scrubber 2 to the collecting tank 13, which also contained 3 m$^3$ of scrubbing solution. These 3 m$^3$ of scrubbing solution contained 900 kg of hexamethylenetetramine. In addition, 35 kg/h of a 25% ammonium hydroxide solution was introduced per hour from the conduit 11. A maximum of 60 liters per hour was discharged from the collecting tank 13 by way of conduit 25 to the storage tank 27.

With this arrangement the waste gas to be treated was purified to a gaseous formaldehyde content of 10 mg/Nm$^3$ or less. The resulting hexamethylenetetramine solution is treated separately.

We claim as our invention:

1. A continuous process for cleaning industrial waste gases containing formaldehyde, which comprises scrubbing the waste gases in a first scrubbing zone with a first aqueous scrubbing solution containing hexamethylenetetramine and ammonium hydroxide, introducing ammonia to said zone, maintaining the hexamethylenetetramine content of the first scrubbing solution at at least 20% by weight by circulating the first scrubbing solution through the first scrubbing zone, then scrubbing the waste gases with a second scrubbing solution in a second scrubbing zone, adding water to said second zone, maintaining the pH value of the second scrubbing solution at not more than 12 by circulating the second scrubbing solution through the second scrubbing zone, introducing a part of the second scrubbing solution continuously or discontinuously into the first scrubbing solution, and continuously or discontinuously removing a part of the first scrubbing solution from the system.

2. A process according to claim 1, characterized in that the hexamethylenetetramine content of the first scrubbing solution is maintained at 20 to 30% by weight.

3. A process according to claim 1 characterized in that the pH value of the second scrubbing solution is maintained at about 8.2.

4. A process according to claim 1 characterized in that the addition of ammonia to the first scrubbing solution is controlled or regulated in dependence on the pH value of the second scrubbing solution.

5. A process according to claim 1 characterized in that water is added continuously to the first scrubbing solution.

* * * * *